No. 627,785. Patented June 27, 1899.
F. W. VEAZIE & J. S. PATTERSON.
PNEUMATIC TIRE.
(Application filed Apr. 28, 1899.)
(No Model.)
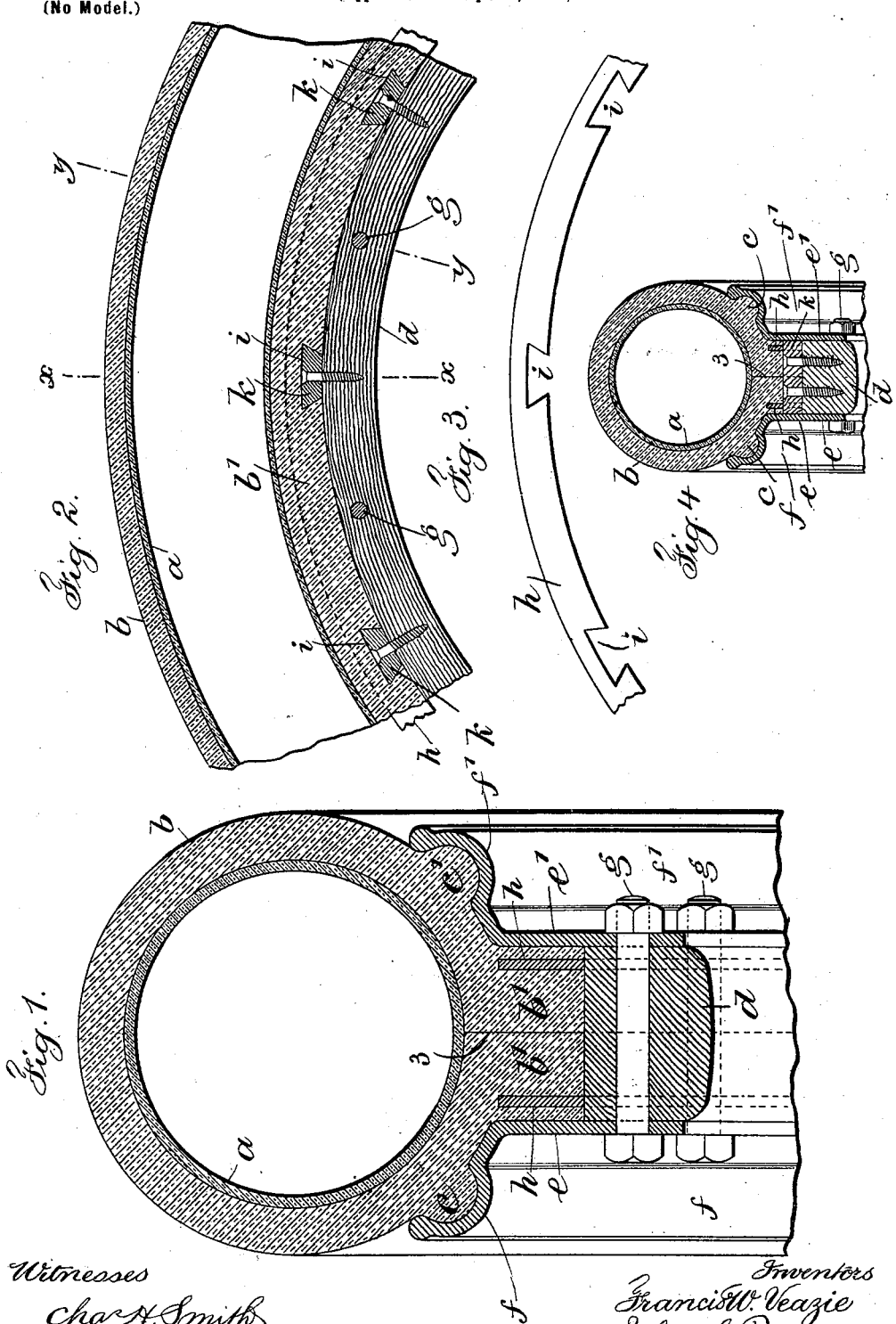

UNITED STATES PATENT OFFICE.

FRANCIS W. VEAZIE AND JOHN S. PATTERSON, OF CHELSEA, MASSACHUSETTS, ASSIGNORS TO THEMSELVES, AND WILLIAM HILLMAN, OF MOUNT VERNON, NEW YORK.

PNEUMATIC TIRE.

SPECIFICATION forming part of Letters Patent No. 627,785, dated June 27, 1899.

Application filed April 28, 1899. Serial No. 714,803. (No model.)

*To all whom it may concern:*

Be it known that we, FRANCIS W. VEAZIE and JOHN S. PATTERSON, citizens of the United States, residing at Chelsea, in the county of Suffolk and State of Massachusetts, have invented an Improvement in Pneumatic Tires, of which the following is a specification.

Our improvement relates especially to pneumatic tires for motor or horseless vehicles. Heretofore in tires of this class difficulties have been encountered in holding the tires which are of large area to the rim or felly of the wheel, because of the lateral strain and the tendency of the tire to creep on the rim in use, and our invention is designed to obviate these difficulties.

In carrying out our invention we employ a tire-shoe divisible at the center over the felly or rim of the wheel, and we employ an inner tube having an air-valve, which air-valve passes through the shoe and the rim at a convenient place.

Each tire-shoe is provided with annular side projections, and the tire-shoe is made with enlarged bases adapted to rest upon the flat surface of the felly or rim of the wheel. We provide side flanges of metal having ribs near their edges, and bolts pass through the flanges and the felly or rim for securing the flanges to the rim.

The annular side projections of the tire-shoe find seats in the ribs of the flanges, said ribs and annular projections being preferably semicircular. We provide metal rings molded in the enlarged bases of the tire-shoe, and these metal rings are made with dovetailed notches at intervals, the notches being cut into the rings from the inner edge, and the bases of the tire-shoe are cut across to correspond to the dovetailed notches. We attach to the outer surface of the felly or rim of the wheel transverse undercut ribs at intervals in the circumference of the rim agreeing with the dovetailed grooves of said metal rings and the bases of the tire-shoe.

The tire-shoe, with the inner tube, is passed from one side of the wheel over the transverse ribs, and when the flanges are secured to the felly or rim the said ribs prevent the tire creeping on the rim in use, they hold the same securely in place, and the ribs on the flanges prevent lateral motion of the tire and chafing at the rim and also give a more secure seat to the tire.

In the drawings, Figure 1 is a cross-section and partial elevation representing our improvement. Fig. 2 is a vertical section of a segment of the tire and rim of smaller size. Fig. 3 is a side elevation of part of one of the metal rings to be molded in the base of the tire, and Fig. 4 is a cross-section at the line $x\,x$ of Fig. 2. Figs. 2, 3, and 4 are drawn to the same scale, Fig. 1 being an enlarged cross-section at $y\,y$ of Fig. 2.

The inner tube is represented at $a$, the tire-shoe at $b$, the bases of the tire-shoe at $b'$, and the annular side projections at $c\,c'$. The felly or rim of the wheel is shown at $d$ and the side flanges, which are preferably of heavy metal, at $e\,e'$, made with ribs $f\,f'$, and $g$ are the bolts passing through the felly or rim and through the side flanges at intervals for securing the said side flanges rigidly to the felly or rim.

The metal rings $h$ are provided with dovetailed notches $i$ at intervals in the circumference of the ring, the said notches being cut into the ring from the inner edge. Each of the enlarged bases of the tire-shoe has one of said rings molded therein, as shown in the cross-section, the precise manner of molding said rings into said bases or holding the same securely to said bases forming no part of our present improvement. The rubber is grooved transversely in line with the notches.

The transverse undercut ribs are shown at $k$. These we secure to the outer surface of the felly or rim $d$ of the wheel at intervals that correspond with the dovetailed grooves $i$ in the rings $h$. These undercut ribs are preferably secured to the rim of the wheel by screws, as shown, although with a rim of metal rivets would probably be employed.

In assembling the parts and putting the tire upon the rim of the wheel the tire-shoe is sprung open at the center division-line 3 and the inner air-tube inserted. The tire-shoe is then placed against one side face of the wheel with the dovetailed grooves of the rings and tire-shoe coinciding with the transverse undercut ribs. The tire-shoe is then slid forcibly upon the wheel against one of the side flanges, which is preferably left upon the other side of the wheel. The other side flange is now put in place and the flanges secured to the rim by the bolts $g$. The tire is then inflated with air and ready for use. This manner of fastening—with the dovetailed grooves, the rings, and the transverse undercut ribs—connects the parts rigidly together and also prevents the tire creeping on the rim in use, and the side flanges prevent lateral motion of the tire, and their ribs form efficient seats for the annular projections of the tire-shoe and prevent chafing at the rim.

We claim as our invention—

1. The combination with the felly or rim of the wheel and an inner tube, of the tire-shoe having enlarged bases and annular projections, side flanges and bolts for connecting the flange to the felly or rim, there being ribs upon the flanges forming seats for the annular projections of the shoe and means for securing the shoe at its enlarged bases to the rim of the wheel, substantially as set forth.

2. The combination with the felly or rim of the wheel, and the tire-shoe having enlarged bases, of flanges and bolts passing through the same and the felly or rim for securing the flanges at opposite sides, rings molded in the bases of said tire-shoe and projections upon the rim of the wheel-tire to engage said rings to hold the tire-shoe in place upon the rim, substantially as set forth.

3. The combination with the wheel-rim and the tire-shoe having enlarged bases adapted to rest upon the wheel-rim, of side flanges and bolts for securing the same to the rim, metal rings molded in the bases of the tire-shoe and setting edgewise, said rings being provided at intervals with dovetailed notches and the tire-bases grooved in line therewith, transverse undercut ribs fastened to the periphery of the felly or rim at intervals agreeing with and fitting the dovetailed grooves to secure the tire-shoe to the rim and prevent the tire creeping on the rim, substantially as set forth.

4. The combination with the rim or felly of the wheel, of a tire-shoe having enlarged bases centrally divisible and adapted to rest upon the wheel-rim and annular projections upon said shoe, side metal flanges and bolts for securing the same to the felly or rim, said side flanges having ribs receiving and forming seats for the projections of the shoe, metal rings molded in the bases of the tire-shoe and setting edgewise, said rings having dovetailed notches at intervals and the tire-bases, transverse grooves corresponding thereto, transverse undercut ribs fastened to the periphery of the felly or rim at intervals with and fitting the dovetailed grooves to secure the tire-shoe to the rim and prevent the tire creeping thereon, substantially as set forth.

Signed by us this 22d day of April, 1899.

FRANCIS W. VEAZIE.
JOHN S. PATTERSON.

Witnesses:
A. A. FICKETT,
EDWIN H. CURRY.